(12) United States Patent
Bruno et al.

(10) Patent No.: US 11,067,147 B2
(45) Date of Patent: Jul. 20, 2021

(54) HYDRAULIC SHOCK-ABSORBER, PARTICULARLY FOR A VEHICLE SUSPENSION, WITH TWO COMPRESSION VALVES

(71) Applicant: SISTEMI SOSPENSIONI S.P.A., Corbetta (IT)

(72) Inventors: Walter Bruno, Asti (IT); Piero Antonio Conti, Asti (IT); Fabio Cotto, Turin (IT); Giordano Greco, Turin (IT); Simone Marchetti, Pesaro (IT)

(73) Assignee: SISTEMI SOSPENSIONI S.p.A., Corbetta (IT)

( * ) Notice: Subject to any disclaimer, the term of this patent is extended or adjusted under 35 U.S.C. 154(b) by 0 days.

(21) Appl. No.: 16/619,046

(22) PCT Filed: Mar. 1, 2019

(86) PCT No.: PCT/IB2019/051652
§ 371 (c)(1),
(2) Date: Dec. 3, 2019

(87) PCT Pub. No.: WO2019/167006
PCT Pub. Date: Sep. 6, 2019

(65) Prior Publication Data
US 2020/0400207 A1 Dec. 24, 2020

(30) Foreign Application Priority Data
Mar. 2, 2018 (IT) .................. 102018000003215

(51) Int. Cl.
*F16F 9/48* (2006.01)
*F16F 9/06* (2006.01)
(Continued)

(52) U.S. Cl.
CPC .............. *F16F 9/064* (2013.01); *F16F 9/062* (2013.01); *F16F 9/3235* (2013.01); *F16F 9/348* (2013.01);
(Continued)

(58) Field of Classification Search
CPC ...... F16F 9/48; F16F 9/49; F16F 9/483; F16F 9/185; F16F 9/187; F16F 9/348
See application file for complete search history.

(56) References Cited

U.S. PATENT DOCUMENTS 2,984,321 A * 5/1961 Schultze ................... F16F 9/49
188/282.8
10,208,830 B2 2/2019 Bruno et al.
(Continued)

FOREIGN PATENT DOCUMENTS

DE 102019206510 A1 * 11/2020 ................ F16F 9/49
JP H03102632 U 10/1991
(Continued)

OTHER PUBLICATIONS

Machine translation of DE 10 2019 206 510 (no date).*
(Continued)

*Primary Examiner* — Nicholas J Lane
(74) *Attorney, Agent, or Firm* — Howard & Howard Attorneys PLLC (57) ABSTRACT

A hydraulic shock-absorber comprises an outer cylindrical tube, an inner cylindrical tube defining with the outer cylindrical tube an annular chamber, a main piston slidably mounted in the inner cylindrical tube and dividing the inner volume of the inner cylindrical tube into an extension chamber and a compression chamber, both containing an incompressible damping fluid, a valve assembly mounted on a bottom wall of the inner cylindrical tube and comprising a first compression valve and a first intake valve, a cup-
(Continued)

shaped body mounted in the inner cylindrical tube, inside the compression chamber, and an auxiliary piston rigidly connected to the main piston and configured to slide in the cup-shaped body at least during a final section of the compression phase of the shock-absorber. The shock-absorber further comprises a second compression valve configured as a non-return valve allowing the flow of the damping fluid only in the direction from a working chamber of the cup-shaped body towards a lower portion of the compression chamber.

10 Claims, 4 Drawing Sheets

(51) Int. Cl.
*F16F 9/32* (2006.01)
*F16F 9/348* (2006.01)
*F16F 9/516* (2006.01)
*F16F 9/49* (2006.01)

(52) U.S. Cl.
CPC ............... *F16F 9/48* (2013.01); *F16F 9/49* (2013.01); *F16F 9/516* (2013.01); *F16F 2222/12* (2013.01); *F16F 2228/066* (2013.01); *F16F 2230/0005* (2013.01); *F16F 2230/183* (2013.01); *F16F 2232/08* (2013.01); *F16F 2234/02* (2013.01)

(56) References Cited

U.S. PATENT DOCUMENTS

| | | | |
|---|---|---|---|
| 10,371,226 | B2 | 8/2019 | Bruno et al. |
| 2012/0247890 | A1 | 10/2012 | Murakami |
| 2013/0081912 | A1 | 4/2013 | Murakami |
| 2015/0330475 | A1* | 11/2015 | Slusarczyk ............... F16F 9/49 188/288 |
| 2016/0223045 | A1* | 8/2016 | Baldoni ............... B60G 15/062 |
| 2018/0058533 | A1* | 3/2018 | Bruno ................... B60G 17/08 |
| 2018/0119770 | A1* | 5/2018 | Bruno .................... F16F 9/516 |
| 2018/0223942 | A1* | 8/2018 | Kus .......................... F16F 9/165 |
| 2019/0186584 | A1* | 6/2019 | Flacht ..................... F16F 9/165 |
| 2020/0256420 | A1* | 8/2020 | Mallin ..................... F16F 9/49 |
| 2021/0054901 | A1* | 2/2021 | Gross ....................... F16F 9/48 |

FOREIGN PATENT DOCUMENTS

| | | |
|---|---|---|
| JP | H03102633 U | 10/1991 |
| WO | 2016127076 A1 | 8/2016 |
| WO | 2016146660 A1 | 9/2016 |
| WO | 2017001675 A1 | 1/2017 |

OTHER PUBLICATIONS

International Search Report and Written Opinion of the International Searching Authority for PCT International Application No. PCT/IB2019/051652 dated Jul. 18, 2019.

* cited by examiner

HYDRAULIC SHOCK-ABSORBER, PARTICULARLY FOR A VEHICLE SUSPENSION, WITH TWO COMPRESSION VALVES

CROSS-REFERENCE TO RELATED APPLICATIONS

The present application is a National Stage of International Patent Application No. PCT/IB2019/051652, filed Mar. 1, 2019, which claims priority to and all the benefits of Italian Patent Application No. 102018000003215, filed on Mar. 2, 2018, both of which are hereby expressly incorporated herein by reference in their entirety.

BACKGROUND OF THE INVENTION

1. Field of Invention

The present invention relates to a hydraulic shock-absorber, in particular a hydraulic shock-absorber with a twin-tube structure.

Even if the invention has been conceived, and will be herein described and illustrated, with reference to its application on a vehicle suspension, it is not to be intended as being limited to this specific application, but may be used in other technical fields.

2. Description of Related Art

A hydraulic twin-tube shock-absorber typically comprises an outer cylindrical tube, an inner cylindrical tube coaxial with the outer cylindrical tube and defining therewith an annular chamber which is filled in an upper portion with a compressible fluid (gas), a rod arranged coaxially with and partially protruding from the top end of the two cylindrical tubes, and a piston that is slidably mounted in the inner cylindrical tube and is fixed to the bottom end of the rod. The piston divides the inner volume of the inner cylindrical tube into an extension chamber and a compression chamber, in which an incompressible damping fluid (oil) is contained. The piston is provided with a first pair of non-return valves, namely a compensation valve that adjusts the flow of the damping fluid from the compression chamber to the extension chamber during the compression phase of the shock-absorber and a rebound valve that adjusts the flow of the damping fluid from the extension chamber to the compression chamber during the extension phase of the shock-absorber. On the bottom of the shock-absorber there is provided a valve assembly comprising a second pair of non-return valves, namely a compression valve that adjusts the flow of the damping fluid from the compression chamber to the annular chamber during the compression phase and an intake valve that adjusts the flow of the damping fluid from the annular chamber to the compression chamber during the extension phase.

International patent application WO 2016/146660 A1 in the Applicant's name discloses a hydraulic twin-tube shock-absorber further comprising a cup-shaped body mounted coaxially in the compression chamber of the shock-absorber, and an auxiliary piston mounted coaxially at the bottom end of the rod of the shock-absorber, so as to slide in the cup-shaped body during the final section of the compression stroke of the piston of the shock-absorber, that is when the piston of the shock-absorber is close to the end-of-travel position during the compression phase. The cup-shaped body comprises a lateral wall, separate from the inner cylindrical tube of the shock-absorber, and a bottom wall. The lateral wall and the bottom wall of the cup-shaped body define, together with the auxiliary piston, a working chamber wherein the damping fluid is compressed by the auxiliary piston when the latter slides in the working chamber towards the bottom wall of the cup-shaped body. Axial channels are provided on the inner surface of the lateral wall of the cup-shaped body for allowing the damping fluid to flow axially out of the working chamber when the auxiliary piston slides in the working chamber towards the bottom wall of the cup-shaped body. The axial channels extend parallel to a longitudinal axis of the cup-shaped body and have a cross section area continuously decreasing along said axis towards the bottom wall of the cup-shaped body. The auxiliary piston comprises a cylindrical body that is fixed to the rod of the shock-absorber and has an outer diameter smaller than the inner diameter of the lower wall portion of the cup-shaped body, a sealing ring that is mounted axially slidable around the cylindrical body and is configured to seal against the inner surface of the lower wall portion of the cup-shaped body, and first and second annular abutment elements that are axially restrained to the cylindrical body and are configured to axially limit, in either direction, the axial sliding movement of the sealing ring along the cylindrical body. The sealing ring, the first abutment element and the second abutment element are configured in such a manner that, when the sealing ring slides along the inner surface of the lower wall portion of the cup-shaped body during the compression stroke of the shock-absorber, the sealing ring is in abutment against the first abutment element and there is no passage of oil from one side of the sealing ring to the other, whereas during the extension stroke of the shock-absorber the sealing ring is in abutment against the second abutment element and oil is allowed to flow from one side of the sealing ring to the other, namely towards the working chamber of the cup-shaped body.

According to such a known solution, a plurality of passages are also provided in the bottom wall of the cup-shaped body for allowing oil to flow out of the working chamber of the cup-shaped body in order to limit the maximum oil pressure in this chamber. The pressure in the working chamber of the cup-shaped body is thus prevented from reaching too high values. As an alternative, or in addition, to the passages in the bottom wall of the cup-shaped body, the function of limiting the maximum pressure in the working chamber of the cup-shaped body may be performed by a conveniently sized notch provided in the sealing ring.

International patent application WO 2017/001675 A1, also in the Applicant's name, discloses a hydraulic twin-tube shock-absorber wherein the working chamber of the cup-shaped body is connected via a bypass conduit to the portion of the compression chamber above the sealing ring, and wherein the shock-absorber further comprises a maximum pressure valve configured to keep the bypass conduit normally closed as long as the pressure in the working chamber is below a given limit value and to open the bypass conduit, thereby allowing discharge of the damping fluid from the working chamber to the compression chamber through the bypass conduit, when the pressure in the working chamber exceeds said limit value. With respect to the known solution described above, the hydraulic shock-absorber known from said application allows to limit more effectively the pressure in the working chamber of the cup-shaped body, also when the rod is moving at high speed. On the other hand, the hydraulic shock-absorber known from said application has a more complicated structure than that of the known solution described above.

SUMMARY OF THE INVENTION

It is an object of the present invention to provide a hydraulic twin-tube shock-absorber that is simple to make and assemble and at the same time is able to effectively limit the maximum pressure in the working chamber of the cup-shaped body.

This and other objects are fully achieved according to the invention by a hydraulic shock-absorber comprising an additional non-return valve allowing the flow of the damping fluid only in the direction from the working chamber of the cup-shaped body to the portion of compression chamber of the shock-absorber comprised between the bottom wall of the cup-shaped body and the valve assembly on the bottom of the inner cylindrical tube when the pressure in said working chamber exceeds a given threshold value, wherein said additional non-return valve comprises at least one closure element arranged outside the cup-shaped body, namely underneath the bottom wall of the cup-shaped body, and configured to normally keep one or more through holes provided in the bottom wall of the cup-shaped body closed and to deform or displace elastically, as the pressure inside the working chamber of the cup-shaped body increases, until allowing the damping fluid to flow through said hole(s) from the working chamber of the cup-shaped body to the underlying portion of the compression chamber.

Such an additional non-return valve thus acts as a compression valve (and, therefore, will be hereinafter referred to as additional compression valve) that affects the evolution of the pressure inside the working chamber of the cup-shaped body once that pressure has reached the aforesaid threshold value. The use of this additional compression valve, in addition to the compression valve provided on the bottom of the inner cylindrical tube of the shock-absorber, avoids providing the bypass conduit in the cylindrical body of the auxiliary piston that is, instead, provided in the prior art discussed above, and allows therefore to simplify the structure of the shock-absorber.

The at least one closure element of the additional non-return valve may be configured as an elastically deformable element arranged to deform elastically above a given pressure value to allow the flow of the damping fluid out of the working chamber of the hydraulic stop member. Alternatively, the at least one closure element may be a rigid element on which an elastic element acts to keep the closure element normally closed. By properly designing the closure element(s), in case of an at least one elastically deformable closure element, or by properly designing the elastic element(s), in case of an at least one rigid closure element, it is possible to obtain a maximum pressure characteristic curve in the working chamber of the cup-shaped body that is dependent on the stroke and the speed of the piston of the shock-absorber.

The additional compression valve may have a structure similar to the one of the compression valve on the bottom of the inner cylindrical tube of the shock-absorber (hereinafter referred to as main compression valve), that is with disk-shaped elastically deformable closure elements that are stacked one on the other on the lower face of the bottom wall of the cup-shaped body and are axially secured to the bottom wall by a locking element, in particular a screw member, that extends through a central hole provided in each one of the elastic closure elements and through a central hole provided in the bottom wall.

A same locking element may be used to lock the elastic closure elements both of the main compression valve and of the additional compression valve, which allows to reduce the overall number of components of the shock-absorber.

The additional compression valve represents a further important element for adjusting the damping level of the shock-absorber during the compression stroke, as it allows to obtain, by a proper calibration, a desired characteristic curve of the damping force as a function of the stroke and of the speed of the piston of the shock-absorber during the final section of the compression phase.

BRIEF DESCRIPTION OF THE DRAWINGS

Other objects, features and advantages of the present invention will be readily appreciated as the same becomes better understood by reference to the following detailed description when considered in connection with the accompanying drawings, wherein.

DETAILED DESCRIPTION OF THE INVENTION

In the following description and claims, terms like "axial" and "axially" refer to the direction of the longitudinal axis of the shock-absorber. Furthermore, terms like "top" and "bottom" are to be intended as referring to the arrangement of the shock-absorber shown in FIG. 1, wherein the piston of the shock-absorber is mounted on the bottom end of the rod and, thus, the rod and the piston move downwards during the compression phase of the shock-absorber and upwards during the extension phase of the shock-absorber.

Figure 1:
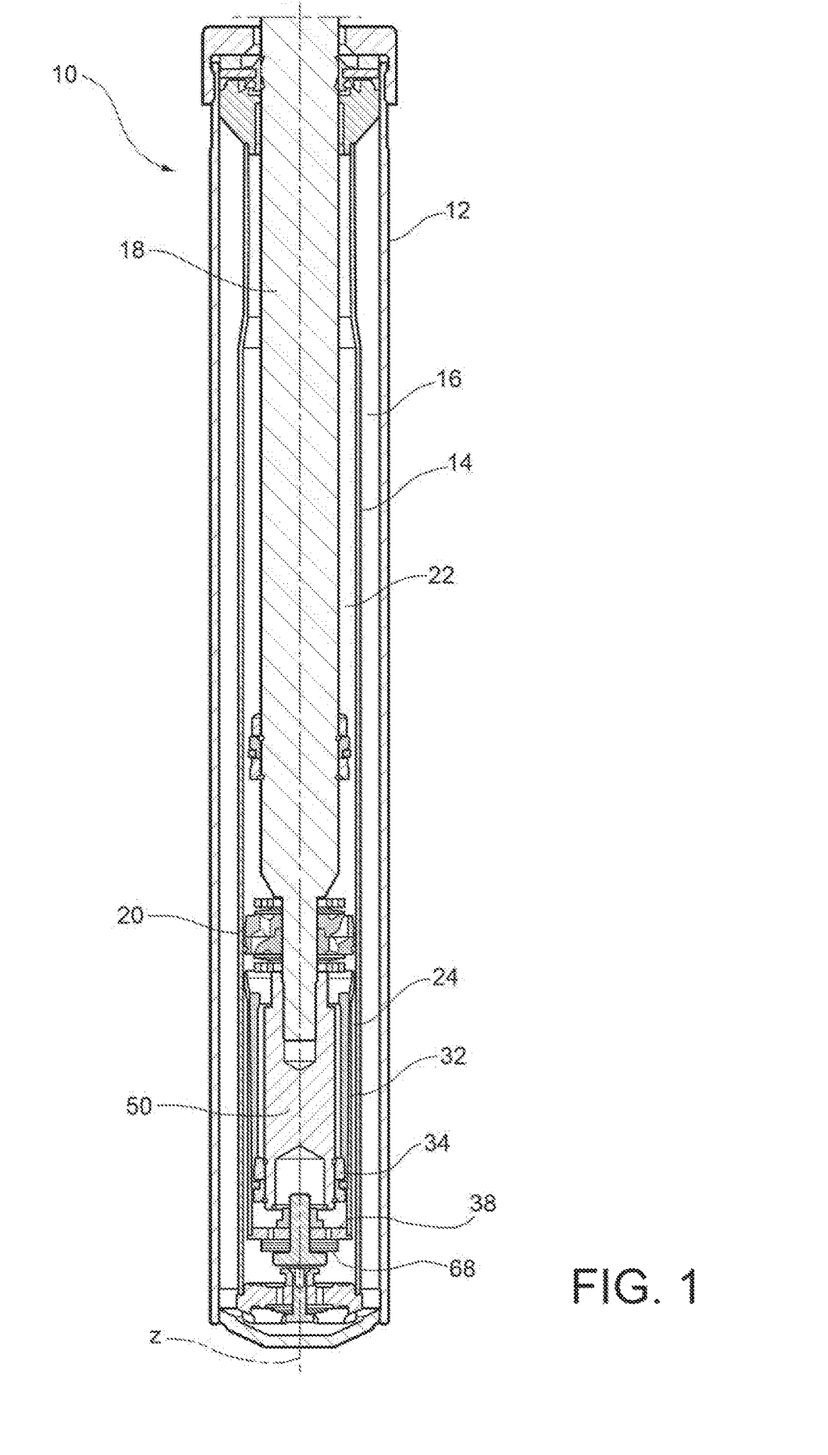
FIG. 1 is an axial section view of a hydraulic twin-tube shock-absorber, particularly for a vehicle suspension, according to an embodiment of the present invention.

With reference to FIG. 1, a hydraulic twin-tube shock-absorber for a vehicle suspension is generally indicated with 10 and comprises, in a per-se-known manner, an outer cylindrical tube 12, an inner cylindrical tube 14 that is arranged coaxially with the outer cylindrical tube 12 and defines therewith an annular chamber 16 filled in a top portion thereof with a compressible fluid (gas), a rod 18 arranged coaxially with and partially protruding from the top end of the two cylindrical tubes 12 and 14, and a piston 20 (hereinafter referred to as main piston) slidably mounted in the inner cylindrical tube 14 and secured to the bottom end of the rod 18.

The longitudinal axis of the shock-absorber 10 is indicated with z.

The main piston 20 divides the inner volume of the inner cylindrical tube 14 into an upper chamber 22, or extension chamber, and a lower chamber 24, or compression chamber, containing an incompressible damping fluid. Oil is typically used as damping fluid and therefore, for the sake of simplicity, the term oil will be used hereinafter to refer to the damping fluid. It is however clear the present invention is not limited to the use of oil as damping fluid, as any other incompressible fluid may alternatively be used.

Figure 2:
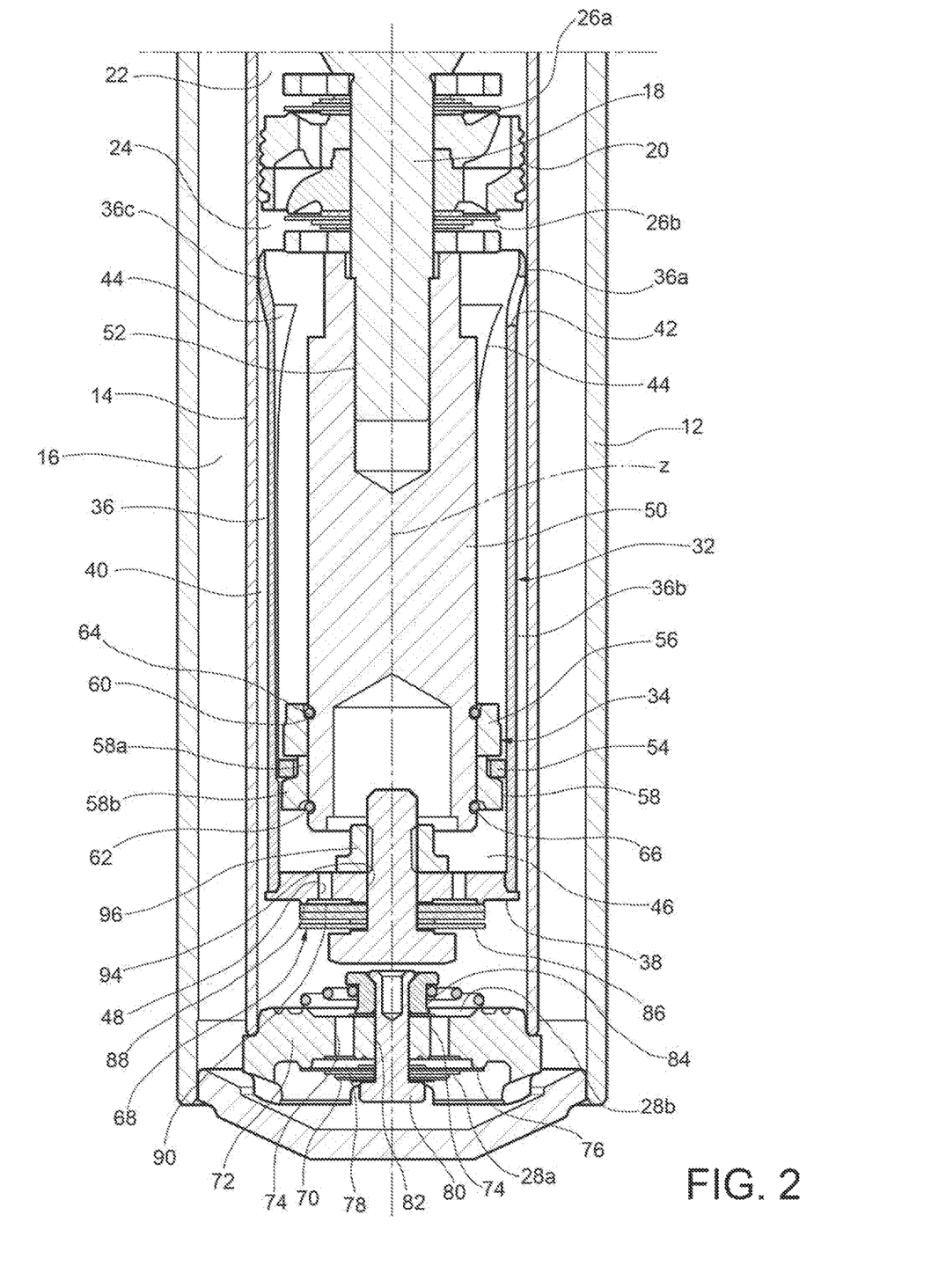
FIG. 2 is an axial section view, on an enlarged scale, of the bottom portion of the shock-absorber of FIG. 1.

With reference to FIG. 2, the main piston 20 is provided, in a per-se-known manner, with a first valve assembly comprising a pair of non-return valves 26a and 26b, namely a so-called compensation valve 26a that adjusts the oil flow from the compression chamber 24 to the extension chamber 22 during the compression phase of the shock-absorber, and a so-called rebound valve 26b that adjusts the oil flow from the extension chamber 22 to the compression chamber 24 during the extension phase of the shock-absorber.

On the bottom of the shock-absorber 10, namely on the bottom of the inner cylindrical tube 14, there is provided, in a per-se-known manner, a second valve assembly comprising a pair of non-return valves 28a and 28b, namely a so-called compression valve 28a that adjusts the oil flow from the compression chamber 24 to the annular chamber 16 during the compression phase, and a so-called intake valve 28b that adjusts the oil flow from the annular chamber 16 to the compression chamber 24 during the extension phase.

The shock-absorber 10 further comprises a cup-shaped body 32 and an auxiliary piston 34.

The cup-shaped body 32 extends coaxially with the inner cylindrical tube 14. Furthermore, the cup-shaped body 32 is made as a separate piece with respect to the inner cylindrical tube 14 of the shock-absorber and is rigidly connected therewith.

The auxiliary piston 34 is connected to the rod 18 of the shock-absorber, preferably in a detachable way (for example, by a threaded coupling), so as to be movable with the rod 18 along the longitudinal axis z. The auxiliary piston 34 is arranged to slide axially in the cup-shaped body 32 to compress the oil contained therein.

The cup-shaped body 32 is open at its top end, that is at its end facing towards the main piston 20, and comprises a lateral wall 36 and a bottom wall 38. The lateral wall 36 and the bottom wall 38 may be made as separate pieces and may be securely connected to each other, for example by force-fit and/or suitable retaining mechanism.

According to the illustrated embodiment, the lateral wall 36 comprises a first wall portion 36a, or inlet wall portion, facing towards the opposite side with respect to the bottom wall 38, that is towards the side of the opening of the cup-shaped body 32, a second wall portion 36b, or lower wall portion, facing towards the bottom wall 38, and a third wall portion 36c, or intermediate wall portion, that connects the inlet wall portion 36a with the lower wall portion 36b. The inlet wall portion 36a has an outer diameter substantially equal to the inner diameter of the inner cylindrical tube 14. The inlet wall portion 36a is securely connected to the inner cylindrical tube 14, for example by force-fit and/or suitable retaining mechanism. The lower wall portion 36b has an outer diameter smaller than the inner diameter of the inner cylindrical tube 14 and, therefore, also smaller than the outer diameter of the inlet wall portion 36a. An annular passage 40 is provided between the lower wall portion 36b of the cup-shaped body 32 and the inner cylindrical tube 14 of the shock-absorber, and is in fluid communication with the portion of the compression chamber 24 underneath the bottom wall 38 of the cup-shaped body 32. The intermediate wall portion 36c has a plurality of radial openings 42 configured to put the portion of the compression chamber 24 comprised between the main piston 20 and the auxiliary piston 34 in communication with the annular passage 40, and therefore with the second valve assembly 28 placed on the bottom of the inner cylindrical tube 14 of the shock-absorber (non-return valves 28a and 28b).

A plurality of axial channels 44 may be provided on the inner surface of the lateral wall 36 of the cup-shaped body 32, in particular on the inner surface of the lower wall portion 36b, and possibly also of the intermediate wall portion 36c, for allowing the flow of oil in the axial direction out of the chamber (hereinafter referred to as working chamber) 46 enclosed by the lower wall portion 36b and comprised between the auxiliary piston 34 and the bottom wall 38, when the auxiliary piston 34 moves towards the bottom wall 38. The axial channels 44 extend parallel to the longitudinal axis of the cup-shaped body 32 (coinciding with the longitudinal axis z of the shock-absorber 10), thus along the direction of movement of the auxiliary piston 34.

The axial channels 44 may have a cross section area decreasing continuously towards the bottom wall 38. More specifically, the axial channels 44 may have a width (that is, a size in the circumferential direction) that decreases continuously, for example linearly, towards the bottom wall 38. A depth (that is, a size in the radial direction) of the axial channels 44 may decrease continuously too, for example linearly, towards the bottom wall 38. The area of the flow section through which the oil may flow out of the working chamber 46 decreases therefore continuously as the auxiliary piston 34 moves in the cup-shaped body 32 towards the bottom wall 38. The decrease in the flow-section area leads to a progressive increase in the damping force generated on the auxiliary piston 34, and therefore on the rod 18 to which the auxiliary piston 34 is fixed. By properly defining the number and/or the cross-section of the axial channels 44 it is possible to obtain a given law of variation of the damping force as a function of the stroke of the auxiliary piston 34 in the cup-shaped body 32. The axial channels 44 may be replaced with calibrated holes or alternatively combined with calibrated holes suitably sized to obtain a given law of variation of the damping force as a function of the stroke of the auxiliary piston 34 in the cup-shaped body 32.

The bottom wall 38 of the cup-shaped body 32 has at least one through hole 48 for allowing oil to flow out of the cup-shaped body 32 in order to limit the increase in the oil pressure in the working chamber 46 during the compression phase. In the embodiment shown in the drawings, the bottom wall 38 has a plurality of through holes 48 whose respective axes are positioned, for example angularly equally spaced, along a circumference having its centre on the longitudinal axis z.

The auxiliary piston 34 comprises a cylindrical body 50 that extends coaxially with the cup-shaped body 32 and is connected to the rod 18 of the shock-absorber, for example by threaded coupling 52, so as to be movable along the longitudinal axis z together with the rod 18. The cylindrical body 50 has an outer diameter smaller than the inner diameter of the lower wall portion 36b of the cup-shaped body 32.

The auxiliary piston 34 further comprises a sealing ring 54 arranged to seal against the inner surface of the lower wall portion 36b of the cup-shaped body 32 to close the working chamber 46 at the top end thereof. In the embodiment described herein, the sealing ring 54 is mounted axially slidable around the cylindrical body 50. Furthermore, the sealing ring 54 may have a notch to allow a small amount of oil to flow from one side of the sealing ring to the other.

The auxiliary piston 34 further comprises a pair of annular abutment elements 56 and 58, namely an upper abutment element 56 arranged above the sealing ring 54, that is, on the side of the sealing ring facing towards the piston 20 of the shock-absorber, and a lower abutment element 58 arranged underneath the sealing ring 54, that is, on the side of the sealing ring facing towards the working chamber 46. The assembly formed by the two abutment elements 56 and 58 is axially secured to the cylindrical body 50 by a pair of retaining rings 60 and 62 received in respective circumferential grooves 64 and 66 provided in the cylindrical body 50. The upper abutment element 56 forms an axial abutment surface, axially facing downwards, that is, towards the lower abutment element 58, against which the sealing ring 54 is brought into abutment during the compression phase. The lower abutment element 58 comprises an upper portion 58a, around which the sealing ring 54 is arranged, and a lower portion 58b having an outer diameter larger than the one of the upper portion 58a, so as to form an axial abutment surface against which the sealing ring 54 is brought into abutment during the extension phase. The sealing ring 54 is thus axially movable between the axial abutment surfaces of the upper abutment element 56 and of the lower abutment element 58.

The shock-absorber 10 further comprises a non-return valve 68 (hereinafter referred to as additional compression valve) mounted outside the cup-shaped body 32, namely underneath the bottom wall 38 of the cup-shaped body 32.

The additional compression valve 68 has a structure and an operation similar to those of the compression valve 28a and allows oil to flow downwards out of the working chamber 46, that is towards the portion of the compression chamber 24 comprised between the bottom wall 38 of the cup-shaped body 32 and the second valve assembly (non-return valves 28a and 28b), when a given value of the oil pressure in the working chamber 46 is exceeded.

In particular, the compression valve 28a comprises a plurality of closure elements 70, which may include elastically deformable elements, mounted on a bottom wall 72 that closes the inner cylindrical tube 14 on the bottom, in particular on the lower face of the bottom wall 72. The compression valve 28a is normally closed. Therefore, in the non-deformed condition the closure elements 70 prevent oil from flowing through holes 74 provided in the bottom wall 72. The through holes 74 may be arranged with their respective axes positioned along a circumference having its centre on the longitudinal axis z. The closure elements 70 may be made as disk-shaped elements and are stacked one on the other. The closure elements 70 may differ from one another in terms of outer diameter and thickness, so that they have different flexibility characteristics from one another. By changing the number and/or type of closure elements it is thus possible to provide the compression valve with the desired characteristics, in terms for example of the pressure value at which the compression valve begins to open.

The pack of closure elements 70 cooperate with an annular projection 76 formed by the lower face of the bottom wall 72 so as to normally close a space 78 defined between the pack of closure elements 70 and the bottom wall 72 and in which the through holes 74 open out.

The pack of closure elements 70 is secured to the bottom wall 72 in a per-se-known manner, for example by a riveted coupling obtained by a locking pin 80 that extends through a through hole 82 at the centre of the bottom wall 72 and is riveted on a nut 84 on the opposite side of the bottom wall 72 relative to the pack of closure elements 70.

When the oil pressure in the portion of the compression chamber 24 comprised between the bottom wall 38 of the cup-shaped body 32 and the bottom wall 72 of the inner cylindrical tube 14 exceeds a given threshold value, which depends on the elastic characteristics and the preload of the pack of closure elements 70 of the compression valve 28a, the pack of closure elements 70 begins to deform, lifting away from the annular projection 76 and allowing the fluid to flow out of the compression chamber 24 through the through holes 74 in the bottom wall 72 towards the annular chamber 16.

Likewise, the additional compression valve 68 comprises a plurality of closure elements 86, which may include elastically deformable elements, mounted on the lower face (that is on the face facing outwards) of the bottom wall 38 of the cup-shaped body 32. Such an arrangement of the closure elements 86 does not take additional space inside the cup-shaped body 32 and allows therefore to maximise the working stroke of the auxiliary piston 34, the axial size of the cup-shaped body 32 remaining unchanged.

The additional compression valve 68 is normally closed too and, therefore, in the non-deformed condition the closure elements 86 prevent the flow of oil through the through holes 48 in the bottom wall 38. The closure elements 86 may also include disk-shaped elements and are stacked one on the other. The closure elements 86 may differ from one another in terms of diameter and thickness so that they have different flexibility characteristics from one another. By changing the number and/or type of closure elements it is thus possible to provide the additional compression valve with the desired characteristics, in terms for example of pressure value at which said valve begins to open.

The pack of closure elements 86 cooperates with an annular projection 88 formed by the lower face of the bottom wall 38 so as to normally close an annular space 90 defined between the pack of closure elements 86 and the bottom wall 38 and in which the through holes 48 open out.

The pack of closure elements 86 is secured to the bottom wall 38 by a locking element 92, such as a locking screw. The locking screw 92 extends through a through hole 94 at the centre of the bottom wall 38 and is secured to the bottom wall 38 by a nut 96 on the opposite side of said wall relative to the pack of closure elements 86. Alternatively, it is possible to use a riveted coupling of the same type as that used for the compression valve 28a (that is, a coupling by a locking pin 80 that is caulked on a nut 84) also for the additional compression valve 68.

The additional compression valve 68 operates as follows.

During the compression phase of the shock-absorber, when the sealing ring 54 of the auxiliary piston 34 begins to slide along the inner surface of the lower wall portion 36b of the cup-shaped body 32, the oil contained in the working chamber 46 is forced to flow out of that chamber in the axial direction through the axial channels 44. The area of the flow section formed by the axial channels 44 decreases continuously, as the auxiliary piston 34 moves towards the bottom wall 38 of the cup-shaped body 32. Therefore, the pressure force applied onto the auxiliary piston 34, and on the rod 18, increases.

As the auxiliary piston 34 moves towards the bottom wall 38 of the cup-shaped body 32, and therefore the volume of the working chamber 46 decreases, the pressure of the oil contained in the working chamber 46 increases. As long as the pressure value in the working chamber 46 remains below the threshold value of the additional compression valve 68 (the threshold value may be set on a desired value by properly adjusting the pack of closure elements 86), the additional compression valve 68 remains closed, thereby preventing oil from flowing from the working chamber 46 to the portion of the compression chamber 24 underneath the bottom wall 38 of the cup-shaped body 32. The additional compression valve 68 may, at most, allow an oil flow through calibrated passages provided directly on the pack of closure elements 86. On the contrary, when the pressure value in the working chamber 46 exceeds said threshold value, the pack of closure elements 86 begins to deform, lifting away from the annular projection 88 and thus allowing the oil to flow from the working chamber 46 to the portion of the compression chamber 24 underneath the bottom wall 38.

Figure 3:
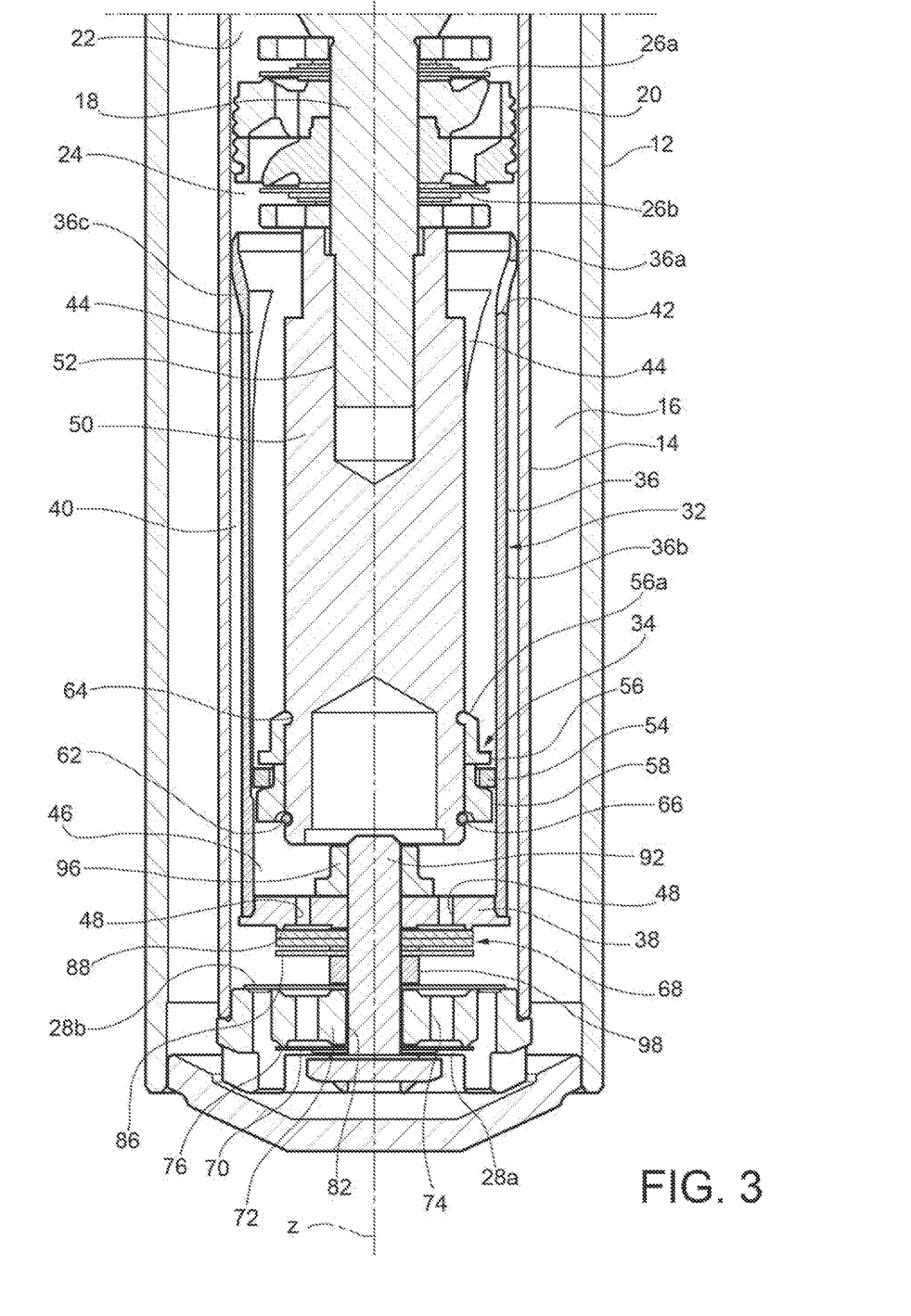
FIG. 3 is an axial section view, on enlarged scale, of the bottom portion of a hydraulic twin-tube shock-absorber, particularly for a vehicle suspension, according to a further embodiment of the present invention.
Figure 4:
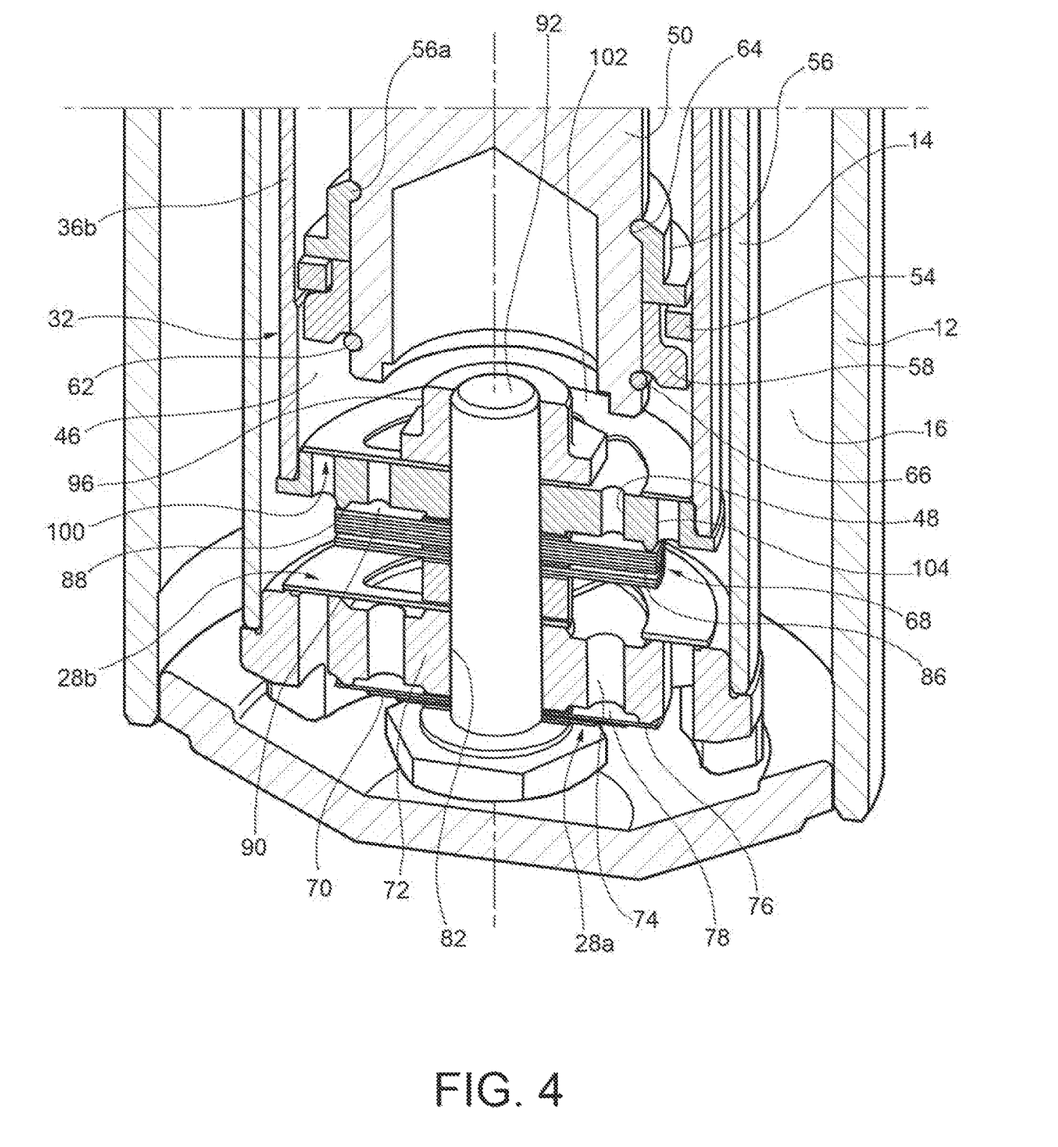
FIG. 4 is a perspective view, on enlarged scale, of the bottom portion of a hydraulic twin-tube shock-absorber, particularly for a vehicle suspension, according to a further embodiment of the present invention.

A further embodiment of a hydraulic shock-absorber according to the invention is shown in FIGS. 3 and 4, where parts and elements identical or corresponding to those of FIGS. 1 and 2 are identified with the same reference numbers.

This further embodiment differs from the one described above with reference to FIGS. 1 and 2 mainly in that the additional compression valve 68 and the compression valve 28a share the locking element with which the respective packs of closure elements 70 and 86 are secured to the respective bottom walls 72 and 38. In other words, the screw 92 and the respective nut 96 are used to secure both the pack of closure elements 70 of the compression valve 28a to the bottom wall 72 and the pack of closure elements 86 of the additional compression valve 68 to the bottom wall 38, a spacing member 98 being interposed between the two packs of closure elements 70 and 86. By screwing the screw 92 on the nut 96 the packs of closure elements 70 and 86 of both the compression valves 28a and 68 are thus locked, and therefore both the structure and the assembly of the shock-absorber are simplified. Furthermore, since the bottom wall 38 of the cup-shaped body 32, and the entire cup-shaped body 32 are thus axially secured to the bottom wall 72 of the inner cylindrical tube 14, a rigid coupling, for example by force-fit and/or suitable retaining mechanism, between the lateral wall 36 of the cup-shaped body 32 and the inner cylindrical tube 14 is no longer required. This clearly contributes to further simplification of the assembly of the shock-absorber.

Furthermore, with respect to the embodiment of FIGS. 1 and 2 the upper abutment element 56 of the auxiliary piston 34 is not secured to the cylindrical body 50 by a retaining ring, but by plastic deformation of an upper edge portion 56a of that element such as to engage the annular groove 64 provided in the cylindrical body 50. This way of locking of the upper abutment element 56 onto the cylindrical body 50 might also be used in the shock-absorber of FIGS. 1 and 2.

In addition, as shown in FIG. 4, the shock-absorber may comprise a further non-return valve 100 operating as an intake valve (hereinafter referred to as additional intake valve) that, like the intake valve 28b on the bottom of the inner cylindrical tube 14, operates during the extension phase to allow oil flow towards the working chamber 46 and thus ensure proper filling of that chamber.

The additional intake valve 100 comprises at least one elastically deformable closure element 102, which may include a disk-shaped element, which is mounted on the bottom wall 38 of the cup-shaped body 32, in particular on the upper face of the bottom wall 38, and cooperates with a plurality of through holes 104 provided in that wall. The additional intake valve 100 is also normally closed and therefore, in the non-deformed condition, prevents oil from flowing through the through holes 104 in the bottom wall 38. When a plurality of closure elements 102 are provided, these may differ from one another in terms of diameter and thickness so as to have different flexibility characteristics from one another. Advantageously, the at least one closure element 102 is secured to the bottom wall 38 of the cup-shaped body 32 by the same nut 96, so that no further locking members for the closure element(s) 102 of the additional intake valve 100 are required.

What has already been explained above with reference to the embodiment of FIGS. 1 and 2 still applies.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A hydraulic shock-absorber comprising
an outer cylindrical tube extending along a longitudinal axis (z),
an inner cylindrical tube coaxial with the outer cylindrical tube and defining with the outer cylindrical tube an annular chamber filled in a top portion thereof with a compressible fluid,
a rod arranged coaxially with the outer cylindrical tube and the inner cylindrical tube and partially protruding from the top end of the outer cylindrical tube and of the inner cylindrical tube,
a main piston slidably mounted in the inner cylindrical tube along said longitudinal axis (z) and fixed to the rod, the main piston dividing an inner volume of the inner cylindrical tube into an extension chamber and a compression chamber, both containing a damping fluid,
a valve assembly mounted on a bottom wall of the inner cylindrical tube and comprising a first compression valve configured as a non-return valve allowing flow of the damping fluid only in a direction from the compression chamber to the annular chamber during a compression phase of the shock-absorber and a first intake valve configured as a non-return valve allowing the flow of the damping fluid only in the direction from the annular chamber to the compression chamber during an extension phase of the shock-absorber, wherein said first compression valve comprises at least one first closure element, that keeps at least one first through hole provided in the bottom wall of the inner cylindrical tube normally closed and to deform or displace elastically, from a given pressure value in the compression chamber, to allow flow of the damping fluid through said at least one first through hole from the compression chamber to the annular chamber,
a cup-shaped body mounted in the inner cylindrical tube, coaxially therewith, inside the compression chamber, and
an auxiliary piston rigidly connected to the main piston and slidably disposed in the cup-shaped body at least during a final section of the compression phase of the shock-absorber,
wherein the cup-shaped body comprises a lateral wall, separate from the inner cylindrical tube, and a bottom wall, said lateral wall and said bottom wall defining, together with the auxiliary piston, a working chamber wherein the damping fluid is compressed by the auxiliary piston when the auxiliary piston slides in the cup-shaped body towards the bottom wall,
wherein the cup-shaped body further comprises a second compression valve configured as a non-return valve allowing flow of the damping fluid only in the direction from the working chamber of the cup-shaped body towards a lower portion of the compression chamber comprised between the bottom wall of the cup-shaped body and the bottom wall of the inner cylindrical tube, wherein said second compression valve comprises at least one second closure element that keeps at least one second through hole provided in the bottom wall of the cup-shaped body normally closed and to deform or displace elastically, from a given pressure value in the working chamber of the cup-shaped body, to allow the flow of the damping fluid through said at least one second through hole from the working chamber to said lower portion of the compression chamber, and wherein said at least one second closure element is arranged outside the cup-shaped body, underneath the bottom wall of the cup-shaped body.

2. The hydraulic shock-absorber as set forth in claim 1, wherein said first compression valve comprises a plurality of first closure elements which are made as disk-shaped elements and are stacked one on the other on a lower face of the bottom wall of the inner cylindrical tube.

3. The hydraulic shock-absorber as set forth in claim 2, wherein said first closure elements are elastically deformable elements and wherein said first compression valve further comprises a first locking element extending through the bottom wall of the inner cylindrical tube to secure said first closure elements to said bottom wall.

4. The hydraulic shock-absorber as set forth in claim 1, wherein said second compression valve comprises a plurality of second closure elements which are made as disk-shaped elements and are stacked one on the other on a lower face of the bottom wall of the cup-shaped body.

5. The hydraulic shock-absorber as set forth in claim 4, wherein said second closure elements are elastically deformable elements and wherein said second compression valve further comprises a second locking element extending through the bottom wall of the cup-shaped body to secure said second closure elements to said bottom wall.

6. The hydraulic shock-absorber as set forth in claim 3, wherein said first locking pin element is formed by a screw extending both through the bottom wall of the inner cylindrical tube and through the bottom wall of the cup-shaped body.

7. The hydraulic shock-absorber as set forth in claim 1, wherein the lateral wall of the cup-shaped body comprises a first wall portion facing towards an opposite side with respect to the bottom wall, a second wall portion facing towards bottom wall and a third wall portion connecting said first wall portion and said second wall portion with each other, wherein said first wall portion has an outer diameter larger than the outer diameter of said second wall portion.

8. The hydraulic shock-absorber as set forth in claim 7, wherein said first wall portion has an outer diameter equal to the inner diameter of the inner cylindrical tube.

9. The hydraulic shock-absorber as set forth in claim 1, further comprising a second intake valve configured as a non-return valve allowing flow of the damping fluid only in the direction from said lower portion of the compression chamber to the working chamber.

10. The hydraulic shock-absorber as set forth in claim 5, wherein said second locking element is formed by a screw extending both through the bottom wall of the inner cylindrical tube and through the bottom wall of the cup-shaped body.

* * * * *

UNITED STATES PATENT AND TRADEMARK OFFICE
CERTIFICATE OF CORRECTION

| | |
|---|---|
| PATENT NO. | : 11,067,147 B2 |
| APPLICATION NO. | : 16/619046 |
| DATED | : July 20, 2021 |
| INVENTOR(S) | : Walter Bruno et al. |

It is certified that error appears in the above-identified patent and that said Letters Patent is hereby corrected as shown below:

In the Claims

Column 12, Line 5 (Claim 6) delete "locking pin element" and insert therefor --locking element--.

Signed and Sealed this
Twenty-first Day of June, 2022

Katherine Kelly Vidal
*Director of the United States Patent and Trademark Office*